United States Patent [19]

Nishikata

[11] Patent Number: 4,805,042

[45] Date of Patent: Feb. 14, 1989

[54] EDITING APPARATUS FOR SEPARATELY RECORDING A PLURALITY OF INFORMATION SIGNALS ALONG WITH RESPECTIVE TIME CODE SIGNALS IN SLANT TRACKS ON A MAGNETIC TAPE

[75] Inventor: Yutaka Nishikata, Kanagawa, Japan

[73] Assignee: Sony Corp., Tokyo, Japan

[21] Appl. No.: 118,318

[22] Filed: Nov. 9, 1987

[30] Foreign Application Priority Data

Nov. 13, 1986 [JP] Japan .................. 61-270730

[51] Int. Cl.$^4$ .................................... H04N 5/782
[52] U.S. Cl. .................................. 360/14.3; 360/49;
360/69; 360/72.2; 358/337
[58] Field of Search .............. 360/14.3, 10.2, 26,
360/27, 14.1, 33.1, 72.2, 69, 70, 49, 13, 14.2;
358/335–337, 342, 906

[56] References Cited

U.S. PATENT DOCUMENTS

| 4,163,263 | 7/1979 | Rotter ................... 360/14.1 |
| 4,280,149 | 7/1981 | Bragas ................... 360/14.1 |
| 4,360,841 | 11/1982 | Mita ..................... 360/14.3 |
| 4,463,391 | 7/1984 | Takano et al. ........... 360/10.2 X |
| 4,680,650 | 7/1987 | Miyazaki ................ 360/33.1 |

FOREIGN PATENT DOCUMENTS

| 0176324 | 4/1986 | European Pat. Off. |
| 2087623 | 5/1982 | United Kingdom |
| 2103866 | 2/1983 | United Kingdom |
| 2115596 | 9/1983 | United Kingdom |

Primary Examiner—Marvin L. Nussbaum
Attorney, Agent, or Firm—Curtis, Morris & Safford

[57] ABSTRACT

In a recording and reproducing or editing apparatus for recording, in successive slant tracks on a magnetic tape, at least a first information signal and, thereafter, a second information signal along with respective time code signals, the time code signal recorded with the first information signal is reproduced therewith prior to the commencement of the recording of the second information signal, and the time code signal to be recorded with the second information signal is synchronized with the reproduced time code signal so that, upon the recording of the second information signal after the first information signal, the respective recorded time code signals represent a continuous time code.

8 Claims, 5 Drawing Sheets

EDITING APPARATUS FOR SEPARATELY RECORDING A PLURALITY OF INFORMATION SIGNALS ALONG WITH RESPECTIVE TIME CODE SIGNALS IN SLANT TRACKS ON A MAGNETIC TAPE

BACKGROUND OF THE INVENTION

1. Field of the Invention

This invention relates generally to a magnetic tape editing apparatus and, more particularly, is directed to a recording and reproducing apparatus of the type in which information signals, such as, video and audio signals are sequentially recorded, together with respective time code signals, in successive slant tracks on a magnetic tape by means of rotary magnetic heads.

2. Description of the Prior Art

In a conventional video signal editing apparatus for sequentially recording information signals, such as, video and audio signals, in successive slant tracks on a magnetic tape by means of rotary magnetic heads, time code signals which indicate "hours", "minutes", "seconds" and "frames" are recorded together with the information signals, for example, as disclosed in U.S. patent application Ser. No. 06/885,203, filed July 14, 1986, and having a common assignee herewith. In such video signal editing apparatus, it is necessary to maintain continuity of the time code data associated with information signals recorded separately, as in the so-called assemble or editing mode.

In order to maintain continuity of the time code data in the assemble mode, it has been proposed to disable the time code generator during each period when the magnetic tape is at rest, and to commence operation of the time code generator for providing the time code signal to be recorded precisely when the movement of the magnetic tape is commenced again for recording of an information signal. However, when the operation of the time code generator is coordinated with the movements of the magnetic tape in the assemble mode, as described above, the operations of the time code generator can not be made to correspond precisely to the tape movements due to overrunning of the tape driving mechanism as a result of inertia and/or mechanical clearances, with the result that it is difficult to maintain continuity of the time code, particularly in respect to the frame units thereof.

OBJECTS AND SUMMARY OF THE INVENTION

Accordingly, it is an object of this invention to provide an improved editing apparatus for separately recording a plurality of information signals in succession along with respective time code signals in slant tracks on a magnetic tape, and which can avoid the above mentioned problems associated with the prior art.

More specifically, it is an object of this invention to provide an editing apparatus, as aforesaid, which can reliably achieve continuity of the time codes recorded with successive information signals in an assemble mode of the apparatus.

It is a further object of this invention to provide an editing apparatus, as aforesaid, which can employ a so-called 8 mm video tape recorder as well as other video tape recorders of the rotary head type.

According to an aspect of this invention, a recording and reproducing or editing apparatus for recording, in successive slant tracks on a magnetic tape, at least a first information signal and, thereafter, a second information signal along with respective time code signals which are to represent a continuous time code, comprises: tape drive means for driving the magnetic tape in forward and reverse directions; rotary magnetic transducer means scanning the successive slant tracks on the magnetic tape when the latter is driven in the forward direction and having recording and reproducing modes for selectively recording and reproducing information signals and respective time code signals in the slant tracks being scanned; control means operative, after the recording of the first information signal and the respective time code signal on the tape, to cause the tape drive means to drive the tape in the reverse direction a predetermined distance and then to drive the tape in the forward direction while the transducing means are in the reproducing mode for reproducing the time code signal recorded with the first information signal; time code generating means for generating a time code signal to be recorded with the second information signal; and means for synchronizing the time code signal generated by the time code generating means with the time code signal reproduced along with the first information signal by the transducing means while the tape is being driven in the forward direction.

In accordance with a feature of this invention, at a time when the time code signal being provided by the time code generating means is synchronized with the reproduced time code signal, the transducing means is changed-over from its reproducing mode to its recording mode in which the time code signal from the time code generating means is recorded with the second information signal.

In accordance with another feature of this invention, the time code signal issuing from the time code generating means at the instant when the tape drive means is made to drive the tape in the reverse direction is stored in a memory and, thereafter, during the driving of the tape in the forward direction with the transducing means in its reproducing mode, the time code signal stored in the memory and the time code signal from the time code signal generating means are applied to a coincidence detector which, upon coincidence of the time code signals received thereby, causes the change-over of the transducing means from the reproducing mode to the recording mode for recording the time code signal then issuing from the time code generating means with the second information signal.

The above, and other objects, features and advantages of the present invention, will be apparent in the following detailed description of a preferred embodiment to be read in conjunction with the accompanying drawings, in which the same reference numerals are employed to identify the corresponding elements and parts in the several views.

DESCRIPTION OF THE PREFERRED EMBODIMENT

Figure 1:
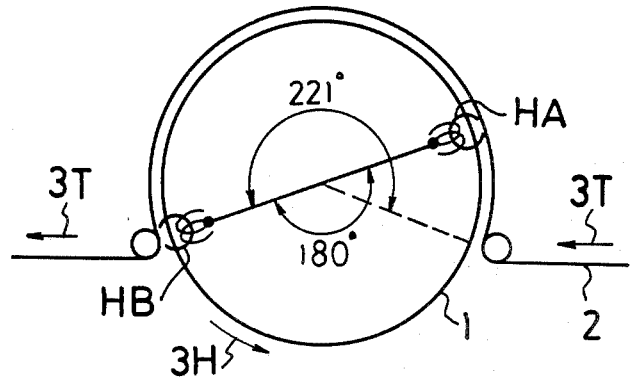
FIG. 1 is a schematic diagram showing a rotary head assembly of a video tape recorder of a type to which the present invention may be applied.

Referring initially to FIG. 1, it will be seen that a rotary head assembly of an 8 mm video tape recorder (VTR) of a type to which the present invention may be desirably applied includes recording and reproducing rotary magnetic heads HA and HB having head gaps with azimuths that are different from each other. The rotary magnetic heads HA and HB are mounted on a rotary head drum at diametrically opposed locations, that is, with an angular spacing of 180° between the heads. The rotary magnetic heads HA and HB are rotated at the frame frequency of a video signal, for example, 30 Hz in the case of NTSC signals, in the direction of the arrow 3H on FIG. 1 and protrude slightly beyond the peripheral guide surface of the rotary drum 1. A magnetic tape 2 is obliquely wrapped around the peripheral surface of the rotary drum 1 over an angular extent of 221°. During a recording or reproducing operation of the VTR, the tape 2 is conventionally driven longitudinally at a constant speed in the forward direction indicated by the arrow 3T, as hereinafter further described. Accordingly, as shown on FIGS. 2 and 3, by reason of the combination of the rotary movements of the heads HA and HB and the longitudinal movement of the tape 2, in the recording and reproducing modes of the VTR, the rotary heads HA and HB alternately scan successive slant tracks TA and TB, respectively, on the magnetic tape 2, with each of the tracks TA and TB having a length corresponding to the circumferential distance traveled by the head HA or HB in moving through an angle of 221°.

Figure 2:
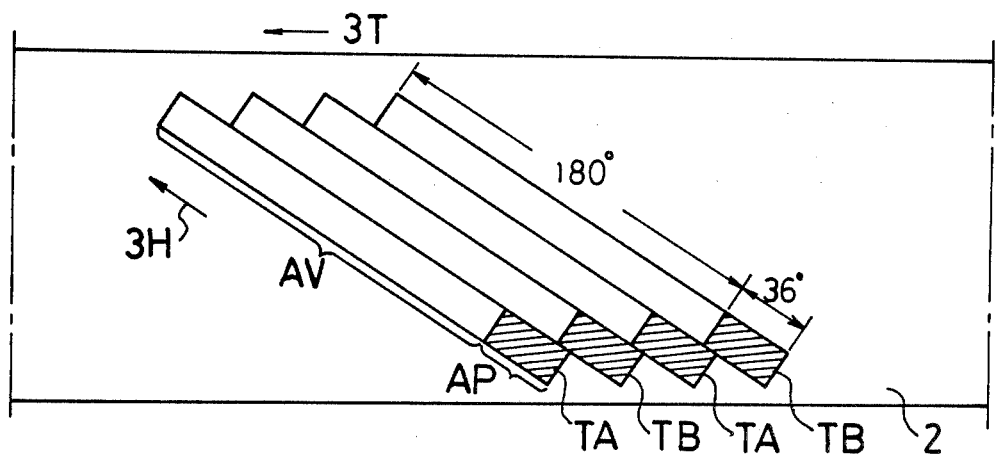
FIG. 2 is a diagrammatic view showing a length of magnetic tape with a pattern of slant tracks thereon in which video and audio signals may be recorded in a so-called normal mode of the video tape recorder having the head assembly of FIG. 1.

In a normal mode, as shown in FIG. 2, a pulse code modulated (PCM) signal relating to one field of a video signal, but having a compressed time base, is recorded in an area AP at which the rotary magnetic head HA or HB begins to trace the track TA or TB along a distance corresponding to the angular movement of the respective rotary magnetic head through an angle of 36°. A video signal of one field is recorded in the following interval or area AV of each track corresponding in length to the movement of the respective rotary magnetic head HA or HB through an angle 180°. The remaining or last interval of each track corresponding to an angular movement of the respective rotary magnetic head through an angle of 5° is employed as a detaching area in which the rotary magnetic head HA or HB moves out of contact with the magnetic tape 2.

Figure 3:
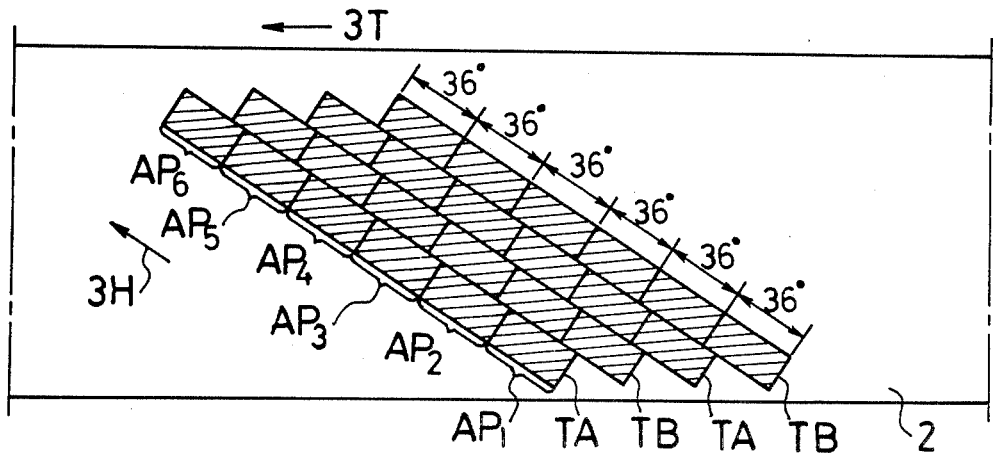
FIG. 3 is a diagrammatic view similar to that of FIG. 2, but showing a track pattern for a so-called PCM multi-track mode in which audio signals of a plurality of channels are recorded in respective segment track areas.

In a PCM multi-track mode, as shown in FIG. 3, fixed segment track areas AP2-AP6, each corresponding in length to the movement of the respective head HA or HB through an angle of 36°, are provided in each track TA or TB in addition to the original segment track area AP1. Thus, there are six segment track areas AP1-AP6 for the recording of the PCM audio signals in each of the slant tracks TA and TB. In other words, a PCM audio signal corresponding to one field and having its time base suitably compressed can be recorded in each of these six segment areas AP1-AP6. Accordingly, in the PCM multi-track mode, an audio signal of one channel can be recorded in the similarly numbered segment track areas in the several tracks, for example, in the segment track areas AP2 of the successive tracks TA and TB.

Figure 4:
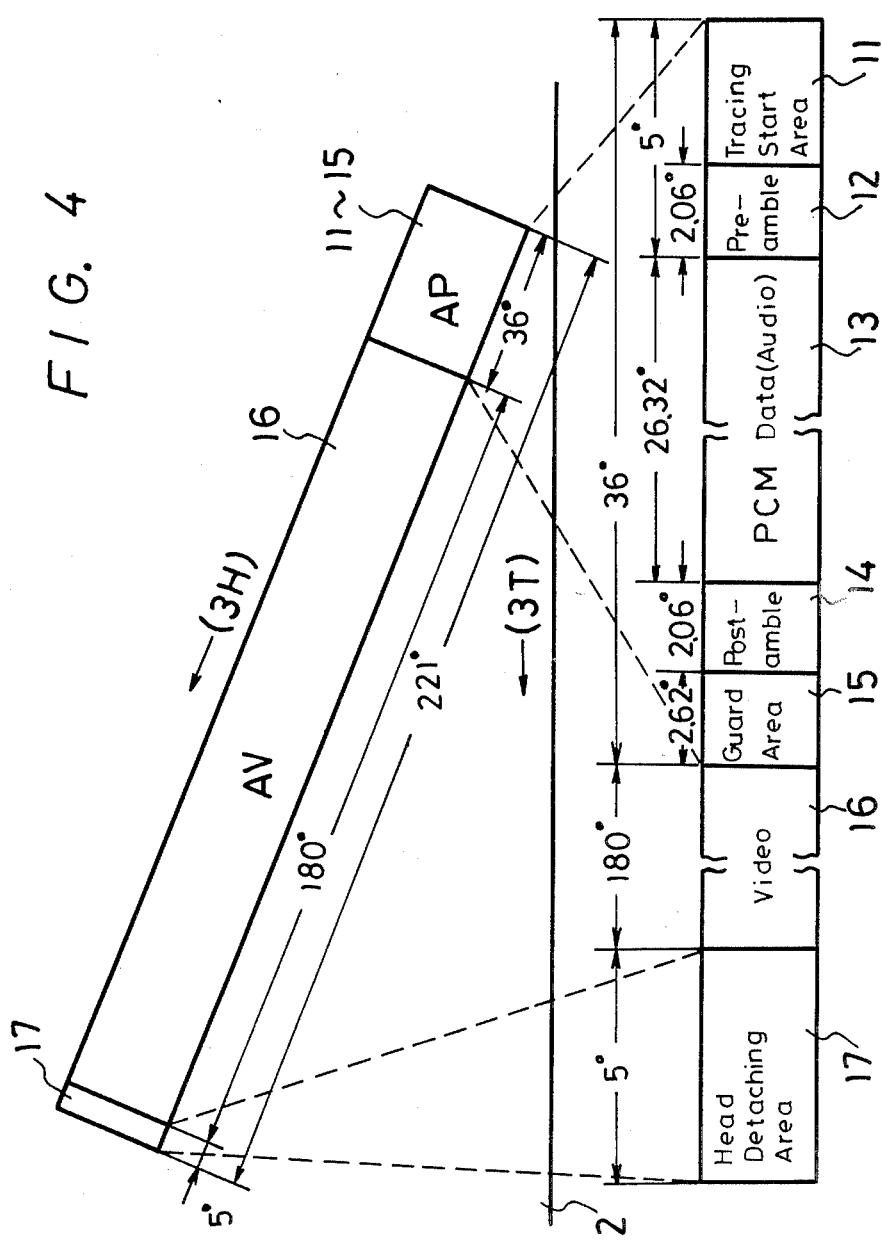
FIGS. 4 and 5 are diagrams showing track formats of the 8 mm video tape recorder for the normal mode and for the PCM multi-track mode of FIGS. 2 and 3, respectively.

The track format in the normal mode shown in FIG. 2 will now be described in greater detail with reference to FIG. 4 in which the rotary head HA or HB is assumed to first come in contact with the magnetic tape 2 at the right hand side of the drawing. In the illustrated track format, a scanning or tracing start area 11 corresponding to angular movement of the respective rotary head through an angle of 5° is provided at the end of the track where contact is initially made. At the concluding portion of tracing start area 11, there is provided a pre-amble or clock run-in area 12 having an extent corresponding to the angular movement of the respective rotary head through an angle 2.06° which corresponds to three horizontal or line intervals of a video signal. The clock run-in signal provided in the pre-amble area 12 is synchronized with the PCM data recorded in a following PCM data area 13 having an extent corresponding to angular movement of the respective rotary head through 26.32° and which is used for the audio signal with a compressed time base. The PCM data area 13 is followed by a post-amble area 14 which ha an extent equal to angular movement of the rotary head through an angle of 2.06° (again corresponding to three horizontal or line intervals), and which provides a back margin area for coping with erroneous displacement of the recording position when using a so-called after-recording mode. After the post-amble area 14, there is provided a guard area 15 having an extent corresponding to an angular displacement of the respective head through 2.62° and which is, in turn, followed by a video signal area 16 having an extent corresponding to angular displacement of the rotary head through 180° and which is provided for the recording of one field of the video signal. Final, after the video signal area 16, there is provided a detaching area 17 having an extent equal to angular displacement of the rotary head through 5°.

Figure 5:
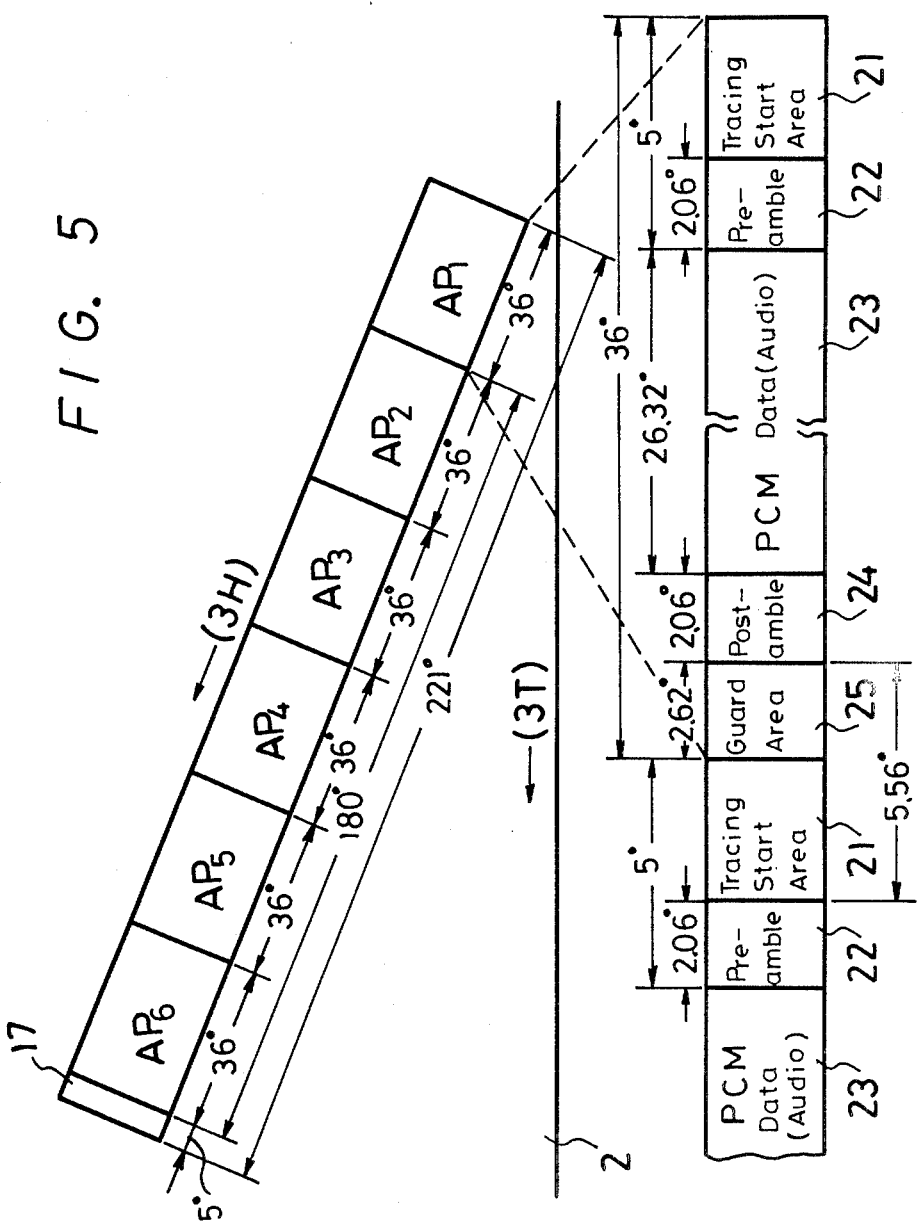

The track format of the PCM multi-track mode shown in FIG. 3 will be described more fully with reference to FIG. 5 in which, as there shown, each of the segment track areas AP1-AP6 in each of the tracks has a format precisely the same as that of the area AP of the above described track format for the normal mode shown in FIG. 4. In other words, each of the segment track areas AP1-AP6 is divided into a tracing start area 21, a pre-amble area 22, a PCM data area 23, a post-amble are a 24 and a guard area 25 having extents equal to those of the areas 11, 12, 13, 14 and 15, respectively, described above with reference to FIG. 4.

With the above described track formats for the normal mode and the PCM multi-track mode, time code data is also recorded in each of the tracks TA and TB, for example, in the post-amble area 14 or 24 of each track format, as will be further described hereinafter.

Figure 6:
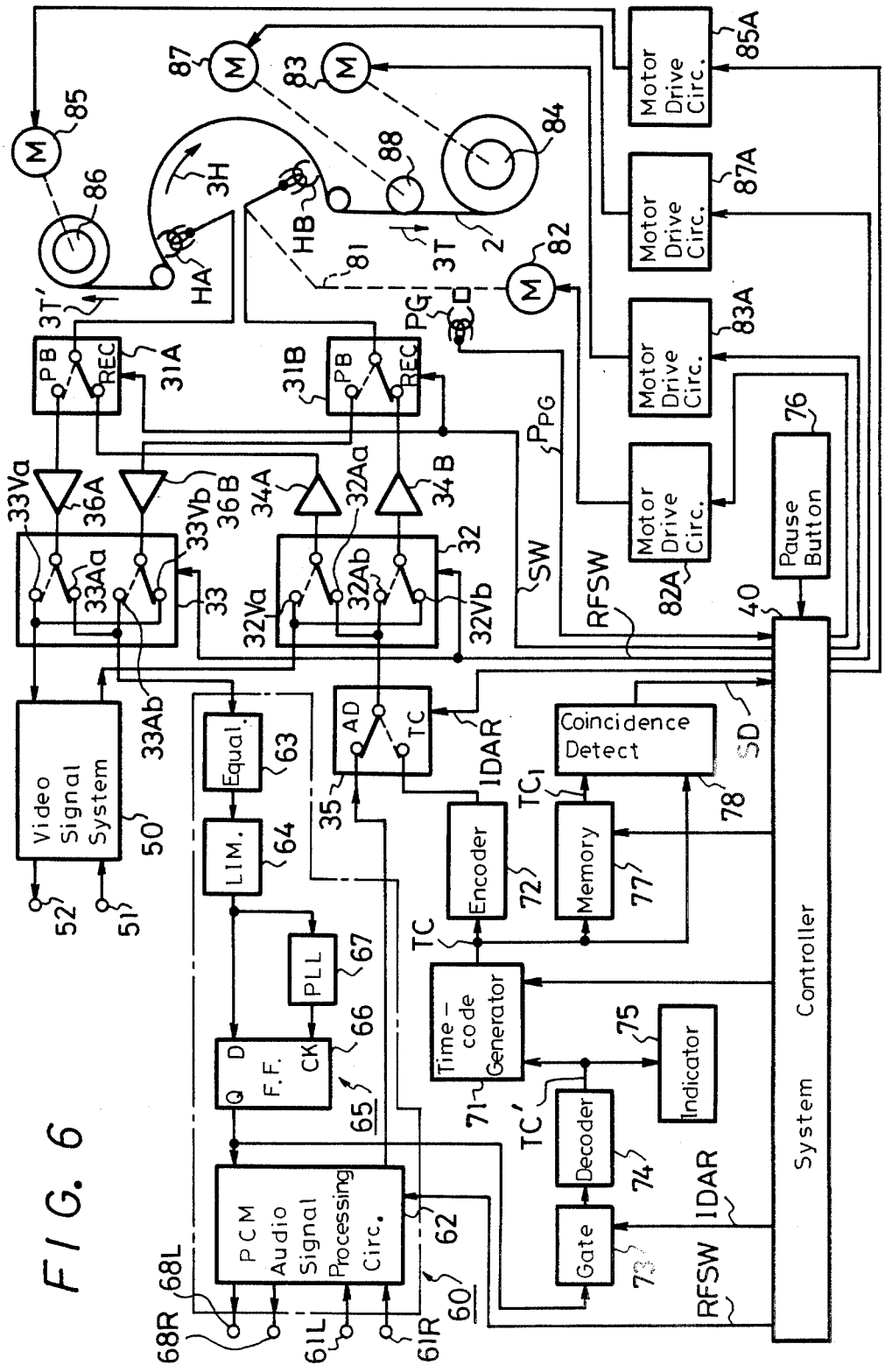
FIG. 6 is a block diagram showing an embodiment of a video signal editing apparatus according to an embodiment of the present invention.

In the embodiment of FIG. 6, the rotary magnetic heads HA and HB are shown to be connected to the movable contacts of record/playback switching circuits 31A and 31B, respectively. The record/playback switching circuits 31A and 31B are supplied with a switching control signal SW from a system controller 40 so that the movable contacts engage respective re-cording contacts REC during a recording operation, and the movable contacts are changed-over to engage respective reproducing or playback contacts PB during a reproducing operation. Recording and reproducing head change-over switching circuits 32 and 33 are changed-over between the positions shown in full lines on FIG. 6 and the positions shown in dotted lines at each ½ revolution of the rotary magnetic heads HA and HB in response to a switching control signal RFSW which is also provided by the system controller 40. The switching control signal RFSW is a rectangular wave signal with a duty ratio of 50% that is formed on the basis of a pulse-signal $P_{PG}$ having a frequency of 30 Hz and which is indicative of the rotational phases of the rotary magnetic heads HA and HB. As shown, the pulse-signal $P_{PG}$ may be provided by a pulse generator PG associated with a shaft 81 through which the rotary magnetic heads HA and HB are driven by a respective electric motor 82. The switching control signal RFSW for the PCM multi-track mode illustrated in FIG. 3 is shifted in phase relative to the switching control signal RFSW for the normal mode shown on FIG. 2 in accordance with the specified segment track area. In other words, the switching control signal RFSW for the PCM multi-track mode is shifted in phase in accordance with the specified segment track area selected from the segment track areas AP1 to AP6 by the amount of 36° x (n-1), were n is an integer equal to from 1 to 6 for the segment track areas AP1 to AP6, respectively.

The recording head change-over switching circuit 32 has two movable contacts connected through recording amplifiers 34A and 34B with the fixed contacts REC of the record/playback switching circuits 31A and 31B, respectively, while the fixed contacts PB of the switching circuits 31A and 31B are connected through playback amplifiers 36A and 36B, respectively, to respective movable contacts of the playback head change-over switching circuit 33.

In the recording system of the 8 mm video tape recorder shown in FIG. 6, an incoming video signal is supplied through an input terminal 51 to a video signal system 50 where it is conventionally processed for recording and then supplied to fixed contacts 32Va and 32Vb of the recording head change-over switching circuit 32. As earlier noted, the recording head change-over switching circuit 32 has its movable contacts changed in position at every ½ revolution of the rotary magnetic heads HA and HB in response to the switching control signal RFSW from the system controller 40. Further, the rotational movements of the rotary magnetic heads HA and HB by motor 82 under the control of a motor drive circuit 82A are conventionally phase-servo-controlled, using the pulse signal $P_{PG}$ as a reference phase, so that a field of the video signal to be recorded is supplied through switching circuit 32 from the fixed contact 32Va thereof, the recording amplifier 34A and the record/playback switching circuit 31A to the rotary magnetic head HA for recording in the area AV of a track TA being scanned thereby, as shown on FIG. 2. Similarly, when the rotary magnetic head HB scans the area AV of a track TB, as illustrated on FIG. 6, a field of the video signal to be recorded is supplied from the contact 32V$_b$ through the head-switching circuit 32 and through the recording amplifier 34B and the record/playback switching circuit 31B to the rotary head HB for recording in the scanned area AV of the track TB.

Figure 7:
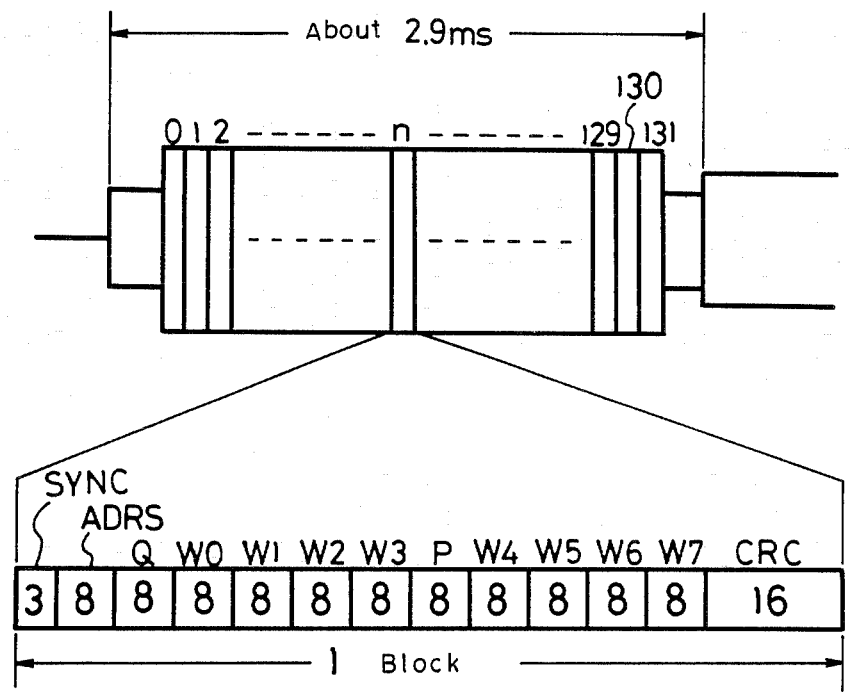
FIG. 7 is a schematic diagram to which reference will be made in explaining the data format of a PCM (pulse code modulated) signal that may be used in an apparatus according to this invention.

The recording system of the 8 mm video tape recorder shown on FIG. 6 further comprises a PCM signal system 60 including a PCM audio signal processing circuit 62 which receives left-and right-channel audio signals through input terminals 61L and 61R, respectively, and PCM-encodes such audio signals into PCM audio data supplied to a fixed contact AD of a PCM switching circuit 35. More specifically, in the PCM audio signal processing circuit 62, the audio signals are digitized and each field of the digitized signals is desirably divided into 132 blocks. As shown in FIG. 7, each block includes parity words P and Q generated as an error correction code and a CRC (cyclic redundancy check) code being also generated for each block. Further, in the PCM audio signal processing circuit 62, the time base of the data corresponding to one field of the video signal is compressed to about 1/5 the original length, and a synchronizing signal SYNC and a block address word ADRS are added to each block is arranged as shown in FIG. 7. The blocks of PCM data are written in a RAM (not shown) of the processing circuit 62 and are read therefrom in response to a PCM area signal generated on the basis of the switching control signal RFSW. In other words, the PCM data is read from the RAM of the processing circuit 62 in the recording mode during each period when the rotary head HA or HB scans a PCM area AP of a track TA or TB.

Each block of the PCM audio data is shown in greater detail on FIG. 7 to be formed of the block synchronizing signal SYNC of 3 bits, the block address word ADRS of 8 bits, the error-correction parity words P and Q each comprised of 8 bits, eight audio data words W0 to W7 of 8 bits each, and the CRC code of 16 bits for error detection and which is generated for address word ADRS to data word W7.

The PCM data read from the RAM of the processing circuit 62 during each period specified by the PCM area signal are modulated into a signal of the frequency 5.8 MHz for each "1" and a signal having a frequency of 2.9 MHz for each "0". The resulting modulated signal is supplied through the fixed contact AD of switching circuit 35 to fixed contacts 32Aa and 32Ab of the recording head changeover switching circuit 32. When the control signal RFSW positions the movable contacts of switching circuit 32 as shown in full lines on FIG. 6, the magnetic head HA scans the area AP of a track TA (FIG. 2) while the head HB scans the area AV of a track TB. At such time, the PCM audio signal is supplied from the fixed contact 32Aa through the switching circuit 32, the recording amplifier 34A and the recording/reproducing switching circuit 31A to the magnetic head HA for recording in the area AP of the track TA then being scanned by such head. Similarly, when the magnetic head HB scans the area AP of a track TB, the switching control signal RFSW changes-over the movable contacts of the switching circuit 32 to the positions shown in broken lines on FIG. 6, so that the PCM audio signal is supplied from fixed contact 32Ab through recording head change-over switching circuit 32, the recording amplifier 34B and the recording/reproducing switching circuit 31B to the magnetic head HB for recording in the area AP of the track TB then being scanned.

As earlier noted, in the PCM multi-track mode, the switching control signal RFSW is shifted in phase by an integral multiple of 36° in accordance with the specified one of the segment track areas AP1–AP6, and the PCM area signal is formed in accordance with the thus phase shifted switching control signal RFSW. Thus, when the magnetic head HA traces the specified one of the segment track areas AP1–AP6 (FIG. 3) of the track TA being scanned, the PCM audio signal is supplied from the contact 32Aa through the recording/reproducing switching circuit 32, the recording amplifier 34A and the switching circuit 31A to the magnetic head HA for recording by the latter in the specified segment track area of the track TA being scanned. Similarly, when the magnetic head HB traces the specified segment track area of a track TB being scanned, the PCM audio signal is supplied from the contact 32Ab through the switching circuit 32, the recording amplifier 34B and the recording/reproducing switching circuit 31B to the magnetic head HB for recording by the latter in the specified segment track area of the track TB being scanned.

In the recording and reproducing or editing apparatus according to this invention, time code signals are recorded with the PCM audio signals in the area AP or the areas AP1–AP6 of each of the tracks TA and TB. For this purpose, a time-code generator 71 is provided to generate time-code data TC supplied to an encoder 72 in which such data is encoded into the same format as shown for a data block on FIG. 7, and then modulated. The resulting modulated time code data is supplied from the encoder 72 to a fixed contact TC of the switching circuit 35. The switching circuit 35 is controlled by an index area signal IDAR received from the system controller 40 and being operative to change-over the movable contact of the switching circuit 35 to the position shown in broken lines on FIG. 6 during the scanning by each of the rotary magnetic heads HA and HB of a part of the post-amble area 14 in the track area AP (FIG. 4) or of a part of the post-amble area 24 of each of the segment track areas AP1–AP6 (FIG. 5) of each of the tracks TA and TB. Therefore, the time-code data is recorded in each post-amble area 14 or 24.

In the reproducing mode of the video tape recorder shown on FIG. 6, the rotary magnetic heads HA and HB are again phase-servo-controlled in a conventional manner, for example, with reference to the pulse-signal P$_{PG}$. Further, in the case of the 8 mm video tape recorder, pilot signals having four different frequencies are cyclically recorded in tracks TA and TB, and such pilot signals are conventionally employed for effecting tracking servo, that is, for insuring that each of the heads HA and HB accurately scans a track TA and a track TB, respectively.

During reproduction of video and audio signals recorded in the normal mode, as shown on FIG. 2, recording/reproducing switching circuits 31A and 31B are changed-over to the positions indicated in dotted lines, and the signals reproduced by the magnetic heads HA and HB are supplied through switching circuits 31A and 31B and through playback amplifiers 36A and 36B, respectively, to the movable contacts of the reproducing head change-over switching circuit 33. As earlier noted, the movable contacts of switching circuit 33 are changed-over between the positions shown in full lines and the positions shown in dotted lines at every ½ revolution of the rotary magnetic heads in response to the switching control signal RFSW from system controller 40.

During the ½ revolution of the rotary magnetic heads HA and HB in which the head HB scans the part AV of a track TB, the movable contacts of switching circuit 33 are positioned as shown in full lines so that the video signal being reproduced from the part AV of a track TB by the head HB is supplied from the latter through the switching circuit 31B, the playback amplifier 36B, the switching circuit 33 to the fixed contact 33Vb, and from the latter to the video signal system 50. During a part of the same ½ revolution of the rotary heads, as the head HA scans the part AP of a track TA, the PCM audio signal reproduced by the head HA is supplied therefrom through the switching circuit 31A, the playback amplifier 36A, the switching circuit 33 to the fixed contact 33Aa and from the latter to the PCM audio signal system 60.

During the next ½ revolution of the rotary heads, that is, when reproducing head switching circuit 33 is changed-over to the position illustrated in dotted lines on FIG. 6, the head HA scans the part AV of a track TA for reproducing a video signal therefrom which is supplied through the switching circuit 31A, the playback amplifier 36A and the head switching circuit 33 to the fixed contact 33Va, and from the latter to the video signal system 50. Further, when the rotary head HB scans the part AP of a track TB, the resulting reproduced PCM audio signal is supplied through the switching circuit 31B, the playback amplifier 36B, the head switching circuit 33 to the fixed contact 33Ab, and from the latter to the PCM audio signal system 60.

In the video signal system 50, the reproduced video signal is processed in a manner complementary to the processing at the time of recording so as to provide an output video signal at an output terminal 52.

In the PCM audio signal system 60, the reproduced PCM audio signal is supplied through a reproducing equalizer 63 and a limiter 64 to a bit synchronizing circuit 65 which includes a D-type flip-flop circuit 66 and a phase-locked loop (PLL) circuit 67. The data comprised of "1"s and "0"s modulated as described above are derived from the flip-flop 66 and supplied to the PCM audio signal processing circuit 62 in which such data are conventionally detected and corrected for error, expanded to the original time base, and reconverted into left and right analog audio signals which are provided at output terminals 68L and 68R, respectively.

During reproducing in the PCM multi-track mode, the PCM audio signals reproduced by the rotary magnetic heads HA and HB in scanning the areas AP1–AP6 in the tracks TA and TB, respectively, are supplied through switching circuits 31A and 31B and playback amplifiers 36A and 36B, respectively, to the movable contacts of the reproducing head change-over switching circuit 33. Since, in the PCM multi-track mode, the switching circuit 33 is changed-over from one position to the other in response to the switching control signals RFSW which has its phase shifted by an integral multiple of 36° in accordance with the specified one of the segment track areas AP1–AP6, the PCM audio signal reproduced from the specified one of the segment track areas AP1–AP6 in the tracks TA and TB is supplied to the PCM signal system 60. In the PCM audio signal processing circuit 62 of the system 60, the PCM audio signal from the specified one of the segment track areas AP1–AP6 is detected and corrected for error, expanded in time base, and reconverted into left and right analog audio signals which are fed to the output terminals 68L and 68R, respectively.

The output signal from the D-type flip-flop 66 is also shown on FIG. 6 to be supplied through a gate circuit 73 to a decoder 74. The gate circuit 73 is supplied with the index area signal IDAR from the system controller 40 as a gating signal. Thus, during reproducing in the normal mode, the time-code signal reproduced from the post-amble area 14 of the part AP of each of the tracks TA and TB is supplied through the gate circuit 73 to the decoder 74. Similarly, during reproducing in the PCM multi-track mode, the time-code signal or data reproduced from the post-amble area 24 of the specified one of the segment tracks areas AP1–AP6 is supplied through the gate circuit 73 to the decoder 74. In either case, in the decoder 74, the reproduced time-code signal is demodulated, detected and corrected for error, and the resulting time-code data TC' is supplied from the decoder 74 to an indicator 75 which visually indicates the position or time along the tape in "hours", "minutes", "second" and "frames".

The 8 mm video tape recorder is further shown on FIG. 6 to conventionally include a motor 83 controlled by the system controller 40 through a motor drive circuit 83A for rotating a reel base 84 coupled to one of the reels on which the tape 2 is wound, and a motor 85 also controlled by the system controller 40 through a motor drive circuit 85A for controlling the rotation of a reel base 86 coupled with the other reel on which the tape 2 is wound. Further, a capstan 88 for driving the tape in a forward direction indicated by the arrow 3T is driven by a capstan motor 87 which is also suitably controlled by the system controller 40 through a motor drive circuit 87A. Of course, during a normal recording or reproducing operation of the video tape recorder, the capstan 88 is driven by its motor 77 to advance or drive the tape in the forward direction 3T at a standard speed with the operation of motor 87 being servo controlled for accurate tracking of the tracks TA and TB by the heads HA and HB, respectively, which are rotationally driven by the motor 82 under the control of the system controller 40 through the motor drive circuit 82A. At the same time, the motor 83 drives the reel base 84 in the direction to wind the tape 2 on the respective reel. On the other hand, for a rewind operation, the motor 85 is operated under the control of the system controller 40 through the motor drive circuit 85A so as to drive the reel base 86 in the direction for winding the tape on the respective reel and thereby causing drive or transport of the tape in the reverse direction indicated by the arrow 3T' on FIG. 6.

For the purpose of providing an assemble edit mode of operation, the apparatus of FIG. 6 is shown to include a pause button 76 connected with the system controller 40. When the pause button 76 is actuated or depressed with the video tape recorder in its recording mode, the system controller 40 suitably controls the reel drive motor 83 and the capstan motor 87 through the respective motor drive circuits 83A and 87A to halt the further movement of the tape in the forward direction indicated by the arrow 3T, and then to cause the reel motor 85 to affect movement of the tape 2 in the reverse direction indicated by the arrow 3T' through a distance corresponding to a little more than 10 tracks or fields, at which point the tape comes to rest with the apparatus being in its so-called recording pause condition. With the apparatus in such recording pause condition, if the pause button 76 is depressed again, the recording pause condition is released and the system controller 40 causes the reel drive motor 83 and capstan motor 87 to effect transport of the magnetic tape 2 in the forward direction and, at the same time, temporarily establishes the reproducing or playback mode. In such temporary reproducing or playback mode, the time-code data TC' issuing from the decoder 74 and corresponding to the time-code signal reproduced along with the PCM audio signal from the area AP, or from the selected one of the segment track areas AP1–AP6, in the tracks TA and TB being scanned, is also supplied to the time-code generator 71.

In the apparatus according to this invention, the time-code generator 71 is controlled by the system controller 40 so that, when the apparatus is in its temporary reproducing mode after its release from the recording pause condition, the time-code data TC issuing from the time-code generator 71 is synchronized with the time-code data TC' being then received from the decoder 74. Further, in accordance with the present invention, the apparatus is changed-over from its temporary reproducing mode to a recording mode for recording a new audio or information signal in a track on the tape at a time when the time-code data TC then issuing from generator 71 for recording along with the new information signal is synchronized with the time-code data earlier recorded with the previous information signal.

More particularly, in the illustrated embodiment of the invention, the time-code data TC from the time-code generator 71 is supplied to a memory 77 and directly to a first input of a coincidence detecting circuit 78 which has a second input for receiving time-code data read out from the memory 77. The coincidence detecting circuit 78 generates a coincidence signal SD when the time-code data TC received directly from the time-code generator 71 coincides with the time-code data $TC_1$ being read out of the memory 77. The memory 77 is controlled by the system controller 40 to write in the memory 77 the time-code data produced by the generator 71 at the time when the pause button 76 is initially depressed to initiate the recording pause condition. Such time-code data written in the memory 77 is stored therein and supplied to the coincidence detector 78 until the latter detects the coincidence thereof with time-code data being provided directly from generator 71 and produces the signal SD supplied to the system controller 40. In response to the signal SD, the system controller 40 changes-over the video tape recorder to its temporary reproducing mode to its recording mode with the assurance that there will be continuity in the time-code signals recorded on the tape before and after such change-over.

The above generally described operation of the apparatus embodying this invention will now be described in further detail with reference to FIG. 8 in which it is assumed that, during a recording operation of the video tape recorder, the pause button 76 is depressed at the time $T_1$ at which time the time-code data TC1 is being provided by the generator 71. In response to such actuation of the pause button 76, the time-code data TC1 is written in the memory 77 and, as earlier noted, further driving of the tape 2 in the forward direction is halted. However, due to inertial and/or mechanical factors, the magnetic tape 2 experiences an overrun $l_a$ beyond its position at the time $t_1$. Then, as earlier described, the system controller 40 causes the reel motor 85 to rewind the tape on the associated reel, and thereby to effect movement of the tape in the reverse direction indicated by the arrow 3T' through a distance of approximately 10 fields or tracks. In this case, there is also an overrun $l_b$ as a result of mechanical factors so that the position of the tape in the recording pause condition can not be precisely predetermined.

Figure 8:
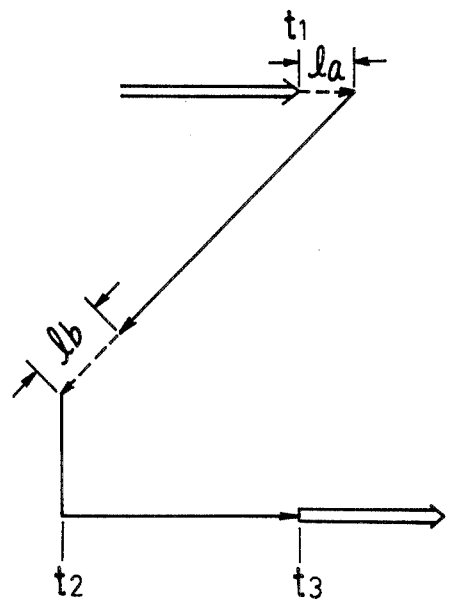
FIG. 8 is a diagram to which reference will be made in explaining the operation of the editing apparatus of FIG. 6 in its assemble mode.

If the pause button 76 is again depressed at the time $T_2$ on FIG. 8, the apparatus is released from the recording pause mode and the temporary reproducing mode is established. In such temporary reproducing mode, the decoder 74 provides time-code data TC' corresponding to the time-code signals being then reproduced from the recorded tracks TA and TB, and the time-code data TC issuing from the time-code generator 71 is synchronized with such time-code data TC'. Therefore, at a time $t_3$ at which the magnetic tape 2 again reaches the position it had at the time $t_1$, the time-code data TC from the time-code generator 71 coincides with the time-code data TC1 from the memory 77. By reason of such coincidence at the time $t_3$, the detector 78 provides the signal SD to the system controller 40 which responds thereto by changing-over the apparatus from its temporary reproducing mode to its recording mode.

In the above described embodiment of the present invention, since the time-code data TC recorded with the audio or other information signal after the apparatus is released from its recording pause mode is synchronized with the time-code data TC' recorded before the apparatus was placed in its recording pause mode, it will be apparent that the successive information signals recorded in an assemble edit operation in response to the actuation of the pause button 76 have recorded time-code signals associated therewith to form a continuous time code along the tape 2.

Although the apparatus according to the above described embodiment of the invention is returned to its recording mode when the time-code data TC from the time-code generator 71 and the time-code data TC1 from the memory 77 coincide with each other, in a modification of such apparatus, the comparison of the time-code data TC from generator 71 and the time-code data TC1 from the memory 77 need not be effected. In such case, the apparatus may be returned to its recording mode upon the lapse of a predetermined time period measured from the time $t_2$ at which the apparatus was released from its recording pause mode. Such predetermined time period is selected so that the time-code data TC from the generator 71 will be surely synchronized with the reproduced time-code data TC' from the decoder 74 at the time when the apparatus is returned to its recording mode from its temporary reproducing mode, whereby continuity of the time code data recorded in the assemble mode is ensured.

It will be apparent from the foregoing that, in a recording and reproducing or editing apparatus according to this invention for recording, in successive slant tracks on a magnetic tape, at least a first information signal and, thereafter, a second information signal along with respective time code signals, the time code signal recorded with the first information signal is reproduced therewith prior to the commencement of the recording of the second information signal, and the time-code signal to be recorded with the second information signal is synchronized with the reproduced time-code signals upon the recording of the second information signal after the first information signal, so that the respective recorded time code signals represent a continuous time code.

Although the invention has been specifically described as applied to an 8 mm video tape recorder, it is to be appreciated that the invention is not limited to such a device, but can be similarly applied to other rotary head-type video tape recorders.

Having specifically described a preferred embodiment of the invention with reference to the accompanying drawings, it is to be understood that the invention is not limited to that precise embodiment, and that various there is changes and modifications may be effected therein by one skilled in the art without departing from the scope or spirit of the invention as defined in the appended claims.

What is claimed:

1. A recording and reproducing apparatus for recording, in successive slant tracks on a magnetic tape, at least a first information signal and, thereafter, a second information signal along with respective time code signals which are to represent a continuous time code, comprising:
    tape drive means for driving the magnetic tape in forward and reverse directions;
    rotary magnetic transducer means scanning said successive slant tracks on the magnetic tape when the latter is driven in said forward direction and having recording and reproducing modes for selectively recording and reproducing information signals and respective time code signals in said slant tracks being scanned;
    control means operative, after the recording of said first information signal and the respective time code signal on said tape, to cause said tape drive means to drive the tape in said reverse direction a predetermined distance and then to drive the tape in said forward direction while said transducing means are in said reproducing mode for reproducing said time code signal recorded with said first information signal;
    time code generating means for generating a time code signal to be recorded with said second information signal; and
    means for synchronizing said time code signal generated by said time code generating means with said time code signal reproduced along with said first information signal by said transducing means while the tape is driven in said forward direction.

2. A recording and reproducing apparatus according to claim 1; further comprising means operative when said time code signal from said time code generating means is synchronized with said reproduced time code signal for changing over said transducing means from said reproducing mode to said recording mode in which said time code signal from the time code generating means is recorded with said second information signal.

3. A recording and reproducing apparatus according to claim 1; wherein said control means includes a system controller and a pause push-button which, when said transducer means is in said reproducing mode for reproducing the previously recorded first information signal and the respective time code signal, is actuable to condition said system controller for causing said tape drive means to drive the tape in said reverse direction for said predetermined distance and then to drive the tape in said forward direction and to change-over said transducing means from said reproducing mode to said recording mode at a time when said time code signal from said time code generating means and said time code signal reproduced by said transducing means are synchronized.

4. A recording and reproducing apparatus according to claim 3; wherein actuation of said pause pushbutton when said transducer means is in said recording mode conditions said system controller to cause said tape drive means to drive the tape in said reverse direction for said predetermined distance and then to change-over said transducer means to a stop mode, whereupon, a subsequent actuation of said pause push-button conditions said system controller to cause drive of the tape in said forward direction and to establish said reproducing mode and then to establish said recording mode at a time when the time code signal from said time code generating means is synchronized with said time code signal reproduced by said transducer means.

5. A recording and reproducing apparatus according to claim 3; wherein said means for synchronizing includes decoder means for decoding the time code signal reproduced by said transducer means and providing a decoded time code to said time code generating means, and said system controller controls said time code generating means so as to make the time code signal therefrom correspond to said decoded time code.

6. A recording and reproducing apparatus according to claim 5; further comprising memory means for storing a time code signal from said time code generating means, and coincidence detecting means receiving the time code signal stored in said memory means and said time code signal from said time code signal generating means and being operative, upon the coincidence of the received time code signals, to provide a coincidence signal to said system controller by which the latter causes said change-over of the transducing means from said reproducing mode to said recording mode for recording said time code signal from said time code generating means with said second information signal.

7. A recording and reproducing apparatus according to claim 6; wherein said memory means is responsive to said system controller to store the time code signal issuing from said time code generating means at the time when said pause push-button is actuated.

8. A recording and reproducing apparatus according to claim 5; further comprising indicating means for indicating said decoded time code obtained from said decoder means.

* * * * *